US009232441B2

(12) United States Patent
Manor (10) Patent No.: US 9,232,441 B2
(45) Date of Patent: Jan. 5, 2016

(54) POWER BASED RATE SELECTION (75) Inventor: Liron Manor, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 479 days.

(21) Appl. No.: 12/862,519

(22) Filed: Aug. 24, 2010

(65) Prior Publication Data

US 2011/0099287 A1 Apr. 28, 2011

Related U.S. Application Data

(60) Provisional application No. 61/238,576, filed on Aug. 31, 2009.

(51) Int. Cl.
*H04W 52/02* (2009.01)
*H04W 28/22* (2009.01)
*H04W 52/26* (2009.01)
*H04W 52/36* (2009.01)

(52) U.S. Cl.
CPC .......... *H04W 28/22* (2013.01); *H04W 52/0225* (2013.01); *H04W 52/0261* (2013.01); *H04W 52/267* (2013.01); *H04W 52/367* (2013.01); *Y02B 60/50* (2013.01)

(58) Field of Classification Search
CPC .................. H04W 52/0261; H04W 52/0225
USPC .................. 709/233; 370/332; 455/127.1
See application file for complete search history.

(56) References Cited

U.S. PATENT DOCUMENTS

| | | | |
|---|---|---|---|
| 6,101,392 A | 8/2000 | Corriveau | |
| 6,333,947 B1 * | 12/2001 | van Heeswyk et al. | 375/148 |
| 6,671,511 B1 | 12/2003 | Forssell et al. | |
| 6,678,517 B2 | 1/2004 | Naim et al. | |
| 6,721,562 B2 | 4/2004 | Kelley | |
| 6,892,076 B2 | 5/2005 | Maalismaa et al. | |
| 6,898,429 B1 | 5/2005 | Vialen et al. | |
| 6,909,703 B2 | 6/2005 | Terry et al. | |
| 7,099,689 B2 | 8/2006 | Bahl et al. | |
| 7,123,590 B2 | 10/2006 | Mir et al. | |
| 7,158,810 B2 | 1/2007 | Schwarz et al. | |
| 7,177,658 B2 | 2/2007 | Willenegger et al. | |
| 7,184,792 B2 | 2/2007 | Mir | |
| 7,260,080 B2 | 8/2007 | Suumaki et al. | |

(Continued)

FOREIGN PATENT DOCUMENTS

| | | |
|---|---|---|
| CN | 1372736 A | 10/2002 |
| CN | 1521956 A | 8/2004 |

(Continued)

OTHER PUBLICATIONS

International Search Report and Written Opinion—PCT/US2010/047180, International Search Authority—European Patent Office—Dec. 10, 2010.

(Continued)

*Primary Examiner* — Asghar Bilgrami
(74) *Attorney, Agent, or Firm* — James Gutierrez (57) ABSTRACT

Systems and methods of selecting a data rate for a wireless communication device are disclosed. Data indicative of a power constraint of a first computing device using the wireless communication device may be transmitted to a second computing device. A maximum data rate may be identified based on, at least in part, a power constraint of the first computing device.

36 Claims, 6 Drawing Sheets

(56) References Cited

U.S. PATENT DOCUMENTS

| | | | |
|---|---|---|---|
| 7,272,120 B2 | 9/2007 | Rajkotia | |
| 7,321,780 B2* | 1/2008 | Love et al. | 455/522 |
| 7,340,615 B2 | 3/2008 | Krantz et al. | |
| 7,352,698 B2 | 4/2008 | Niwano et al. | |
| 7,433,334 B2 | 10/2008 | Marjelund et al. | |
| 7,647,033 B2* | 1/2010 | Uozumi et al. | 455/260 |
| 7,693,543 B2 | 4/2010 | Schwarz et al. | |
| 7,804,837 B2 | 9/2010 | Maansaari et al. | |
| 7,907,560 B2 | 3/2011 | Jang et al. | |
| 7,991,387 B2 | 8/2011 | Rowley et al. | |
| 8,130,705 B2 | 3/2012 | Bhattacharjee et al. | |
| 8,169,973 B2* | 5/2012 | Palenius et al. | 370/332 |
| 2001/0010685 A1 | 8/2001 | Aho | |
| 2001/0026538 A1 | 10/2001 | Bruss | |
| 2002/0045458 A1 | 4/2002 | Parantainen et al. | |
| 2003/0224820 A1 | 12/2003 | Einola et al. | |
| 2004/0002366 A1 | 1/2004 | Cromer et al. | |
| 2004/0047328 A1* | 3/2004 | Proctor et al. | 370/342 |
| 2004/0081115 A1* | 4/2004 | Parsa et al. | 370/320 |
| 2004/0198369 A1 | 10/2004 | Kwak et al. | |
| 2005/0128956 A1 | 6/2005 | Hsu et al. | |
| 2006/0019647 A1 | 1/2006 | Muhonen et al. | |
| 2006/0083191 A1 | 4/2006 | Niwano et al. | |
| 2006/0133307 A1 | 6/2006 | Fukasawa et al. | |
| 2006/0211425 A1 | 9/2006 | Bae et al. | |
| 2006/0229102 A1 | 10/2006 | Kitazoe et al. | |
| 2006/0262732 A1 | 11/2006 | Joutsenvirta et al. | |
| 2007/0207794 A1 | 9/2007 | Dunko | |
| 2007/0224990 A1 | 9/2007 | Edge et al. | |
| 2007/0254647 A1 | 11/2007 | Salkintzis | |
| 2008/0144582 A1 | 6/2008 | Das et al. | |
| 2008/0274739 A1 | 11/2008 | Wu | |
| 2008/0300027 A1 | 12/2008 | Dou et al. | |
| 2009/0077395 A1 | 3/2009 | Tsai | |
| 2009/0082028 A1 | 3/2009 | Hosein et al. | |
| 2009/0129339 A1 | 5/2009 | Young et al. | |
| 2009/0141783 A1* | 6/2009 | Kirrmann | 375/219 |
| 2009/0149162 A1 | 6/2009 | Tenny | |
| 2009/0180414 A1 | 7/2009 | Maeda et al. | |
| 2009/0196259 A1 | 8/2009 | Pani et al. | |
| 2009/0270109 A1* | 10/2009 | Wang Helmersson et al. | 455/453 |
| 2010/0034094 A1 | 2/2010 | Tenny | |
| 2010/0182963 A1 | 7/2010 | Fischer et al. | |
| 2010/0183051 A1* | 7/2010 | Margarit | 375/146 |
| 2012/0195249 A1 | 8/2012 | Bhattacharjee et al. | |

FOREIGN PATENT DOCUMENTS

| | | |
|---|---|---|
| CN | 1666554 A | 9/2005 |
| CN | 1751534 A | 3/2006 |
| CN | 101233720 A | 7/2008 |
| CN | 101427479 A | 5/2009 |
| EP | 1437912 A1 | 7/2004 |
| EP | 1679914 A1 | 7/2006 |
| EP | 1750469 A1 | 2/2007 |
| JP | 2000152337 A | 5/2000 |
| JP | 2002164838 A | 6/2002 |
| JP | 2004320240 A | 11/2004 |
| JP | 2005073261 A | 3/2005 |
| JP | 2005525032 A | 8/2005 |
| JP | 2005528050 A | 9/2005 |
| JP | 2005323296 A | 11/2005 |
| JP | 2005536091 A | 11/2005 |
| JP | 2006020339 A | 1/2006 |
| JP | 2006054856 A | 2/2006 |
| JP | 2006129440 A | 5/2006 |
| JP | 2006191455 A | 7/2006 |
| JP | 2006516870 A | 7/2006 |
| JP | 2006520170 A | 8/2006 |
| JP | 2008503910 A | 2/2008 |
| JP | 2009504041 A | 1/2009 |
| JP | 2009530994 A | 8/2009 |
| JP | 2010510694 A | 4/2010 |
| KR | 20040086972 A | 10/2004 |
| KR | 20050020458 A | 3/2005 |
| KR | 100606047 | 7/2006 |
| KR | 20060104258 A | 10/2006 |
| TW | 253245 B | 4/2006 |
| TW | 259000 B | 7/2006 |
| WO | 9963682 A2 | 12/1999 |
| WO | 0054536 A1 | 9/2000 |
| WO | 2004004407 A1 | 1/2004 |
| WO | 2004017540 A1 | 2/2004 |
| WO | WO-2004082094 A2 | 9/2004 |
| WO | 2005020618 A1 | 3/2005 |
| WO | 2005079097 A1 | 8/2005 |
| WO | 2005107311 A1 | 11/2005 |
| WO | 2006010312 A1 | 2/2006 |
| WO | 2006086497 A1 | 8/2006 |
| WO | WO-2007003707 A1 | 1/2007 |
| WO | 2007014630 A1 | 2/2007 |
| WO | 2007025138 A2 | 3/2007 |
| WO | 2007109695 | 9/2007 |
| WO | 2007144956 A1 | 12/2007 |
| WO | 2008043078 A2 | 4/2008 |

OTHER PUBLICATIONS

3GPP: "3GPP TR 25.813 v7.0.0 (Jun. 2006) 3rd Generation Partnership Project; Technical E Access Network; Evolved Universal Terrestrial Radio Access (E-Utra) and Evolved Univers Network (E-UTRAN); Radio interface protocol aspects (Release 7)" 3rd Generation P1 (3GPP); Technical Report (TR), XX, XX, vol. 25.813, No. WOO, Jun. 19, 2006.

3GPP TS 25.306 V6.8.0 3rd Generation Partnership Project; Technical Specification Group Radio Access Network; UE Radio Access capabilities (Release 6) (Mar. 2006) pp. 1-33.

Anonymous: "Extract from: 3GPP TS 25.331 V6.10.0 (Jun. 2006) Technical Specification Project; Technical Specification Group Radio Access Network; Radio Resource Control (RR (Release 6), chapter 8.2.2.3 and 8.5.26" 3GPP, (Online) Jun. 2006, XP002468797 Publication Retrieved from the Internet:URL:ftp://ftp.3gpp.org/specs/archive/25_series/2:2008-02-13) cited in the application.

Ericsson: "Proposed changes to the RRC protocol specifcation regarding RRC connection establishment and re-establishment procedures" 3GPP Draft; R2-99417, 3rd Generation Partnership Project (3GPP), Mobile Competence Centre ; 650, Route Des Lucioles ; F-06921 Sophia-Antipolis Cedex ; France, vol. RAN WG2, No. Berlin; 19990521, May 21, 1999, XP050112770 [retrieved on May 21, 1999] the whole document.

Nokia, DOCOMO: "Stage_2_Description of UE capability_for E-UTRAN," 3GPP TS-RAN R2-062211 (Online), Sep. 1, 2006 (2-006-09:01), XP002468908 Internet Publicat Internet:URL:http://www.3gpp.org/ftp/tsg_ran/WG2_RL2/TSGR2_54/Documents/ > (retrieved).

Qualcomm Europe: "3GPP TSG-RAN WG2 meeting #55: R2-062961: Framework for UE LTE" (Online) Oct. 13, 2006, XP002468961 Internet Publication Retr URL:http://www.3gpp.org/ftp/tsg_ran/Wg2_RL2/TSGR2_55/Documents/ > chapter 2.1 and 2.2.

Universal Mobile Telecommunications System (UMTS); UE Radio Access capabilities definition (3GPP TS 25.306 version 7.0.0 Release 7): ETSI TS 125 306 ETSI Standards, European Telecom,Standards Institute, Sophia-Antipo, FR, vol. 3-R2, No. V700, Mar. 2006, XP014034281, ISSN: 0000-0001 cited in the applications chapter 4.5.1, in particular p. 8, lines 9-14.

Panasonic, "MBMS UE capability", [online], 3GPP TSG RAN WG1 #38bis, Sep. 20, 2004, R1-041233, Retrieved from the Internet: URL: http://www.3gpp.org/ftp/tsg_ran/WG1_RL1/TSGR1_38bis/Docs/R1-041233.zip, (2011-10051-162).

"Universal Serial Bus Usage Tables for HID Power Devices", Nov. 1, 1997, pp. 1-66, XP55081132, Retrieved from the Internet: URL : http://www.usb.org/developers/devclasshttp://www.usb.org/developers/devclass_docs/pdcv10.pdf.

* cited by examiner

POWER BASED RATE SELECTION

CROSS REFERENCE TO RELATED APPLICATION

This application claims the benefit of U.S. Provisional Application No. 61/238,576, filed Aug. 31, 2009, the entire content of which is incorporated herein by reference.

BACKGROUND

1. Field

The present invention generally relates to communication systems. In particular, it relates to radio and/or data rate selections in communication systems.

2. Relevant Background

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

Communication devices such as broadband wireless modems may be used in wireless communication systems, specifically to provide computing devices with access to the wireless communication systems. The computing devices may have a limited amount of power available for use. The communication devices may use the power obtained from the computing devices. Better control of the power used by the communication device may be desirable.

SUMMARY

One embodiment comprises a wireless communication apparatus. The wireless communication apparatus comprises a processor configured to identify a maximum data rate based on, at least in part, a power constraint of a first computing device. The wireless communication apparatus further comprises a transceiver configured to transmit data indicative of the maximum data rate to a second computing device.

Another embodiment comprises a wireless communication apparatus. The wireless communication apparatus comprises means for communicating with a first computing device. The wireless communication apparatus further comprises means for identifying a maximum data rate based on, at least in part, a power constraint of the first computing device. The wireless communication apparatus further comprises means for transmitting data indicative of the maximum data rate to a second computing device.

Yet another embodiment comprises a method for communicating data. The method comprises identifying a maximum data rate based on, at least in part, a power constraint of a first computing device. The method further comprises transmitting data indicative of the maximum data rate to a second computing device.

A further embodiment comprises a computer program product, comprising a computer-readable medium. The computer-readable medium comprises code for causing a computer to identify a maximum data rate based on, at least in part, a power constraint of a first computing device. The computer-readable medium further comprises code for causing a computer to transmit data indicative of the maximum data rate to a second computing device.

DETAILED DESCRIPTION OF CERTAIN EMBODIMENTS

The following detailed description is directed to certain specific embodiments of the invention. However, the invention can be embodied in a multitude of different ways. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects connections between mobile devices and displays may be based on wireless protocols. In some aspects, communication channels between devices may be based on a wired data transmission.

The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the embodiments shown, but is to be accorded with the widest scope consistent with the principles and features disclosed herein. The word "exemplary" is used herein to mean "serving as an example, instance, or illustration." Any embodiment described herein as "exemplary" is not necessarily to be construed as preferred or advantageous over other embodiments. The terms "networks" and "systems" are often used interchangeably.

Figure 1:
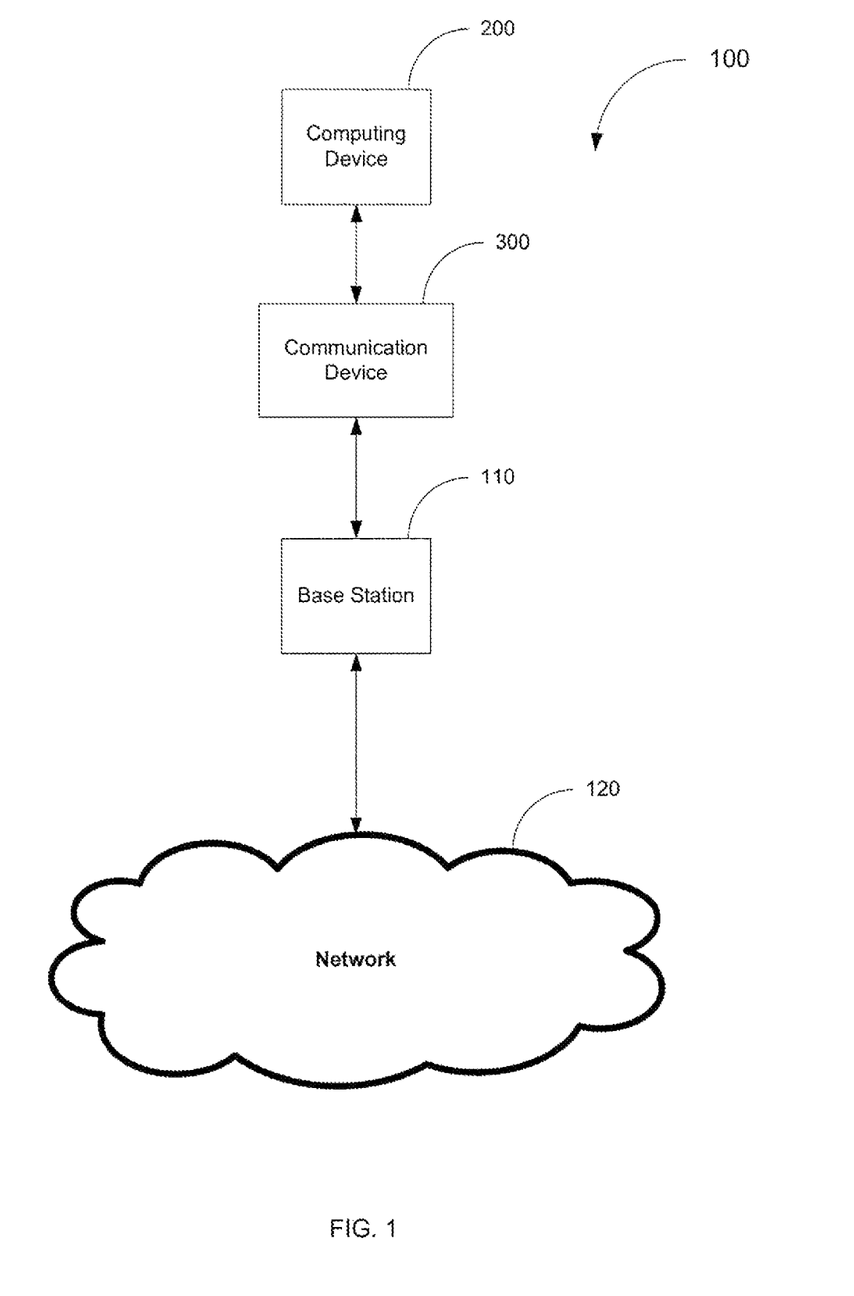
FIG. 1 is a diagram illustrating an exemplary communication network.

FIG. 1 is a diagram illustrating an exemplary communication network 100. The wireless communication network 100 may be configured to support communication between a number of users (e.g., computing device 200 shown in FIG. 2). The computing device 200 is in communication with a communication device 300, shown in FIG. 3. As discussed below in conjunction with FIGS. 2 and 3, the computing device 200 may use the communication device 300 to communicate with the base station 110 and other devices which may be in communication with the network 120. The base station 110 is in communication with the network 120 and may be able to transmit data to and/or receive data from other devices in communication with the network 120.

As discussed earlier, the computing device 200 may use the communication device 300 to communication with the base station 110 and the network 120. The communication device may establish a wireless link between the communication device 300 and the base station 110. The wireless link between the communication device 300 and the base station 110 may have data rate (e.g., a maximum allowed amount of data that may be transmitted and/or received within a period of time). For example, the wireless link between the communication device 300 and the base station 110 may have a data rate of 1 megabit per second (mbps). This generally means that the base station 110 and the communication device 300 may transmit at most 1 million bits of data to and/or receive 1 million bits data from each other, during the time period of one second. In other embodiments, the wireless link between the communication device 300 and the base station 110 may comprise a variety of data rates. For example, the data rate of the wireless link between the communication device 300 and the base station 110 may be 10 mbps, 150 mbps, 6.4 mpbs etc.

As discussed below in conjunction with FIGS. 2 and 3, the communication device 300 may use power from the computing device 200 to transmit data to and/or receive data from the base station 110. The amount of power used by the communication device 300 may depend on the data rate of the wireless link. In general, the higher the data rate of the wireless link, the more power communication device 300 may use from the computing device 200. In one embodiment, the computing device 200 may limit the amount of power that the communication device 300 may use. This may cause problems with the operation of the communication device 300. For example, the communication device 300 may try to obtain a higher data rate for the wireless link, based on the amount of data to be transmitted to the base station 110. If the power needed by the communication device 300 exceeds the power constraint (e.g., limit on the amount of power that can be used) of the computing device 200, the communication device 300 may encounter errors such as device resets, dropped wireless links, and data errors. The communication device 300 may obtain the power constraint of the computing device 200 in order to mitigate this problem. The communication device 300 may use the power constraint to obtain a maximum allowed data rate, such that the communication device 300 uses an amount of power within the power constraint when transmitting and/or receiving data at the maximum allowed power rate.

Figure 2:
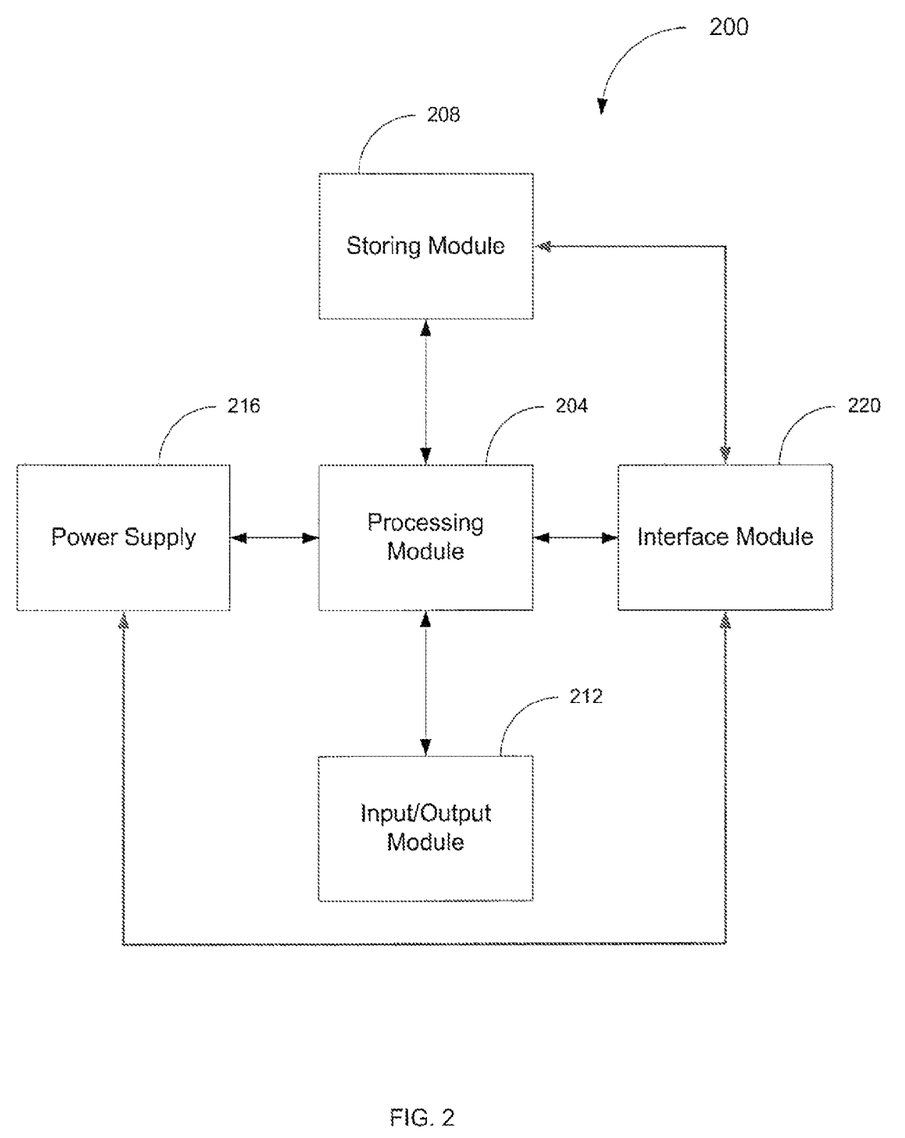
FIG. 2 is a block diagram of an exemplary computing device.

FIG. 2 is a block diagram of an exemplary computing device 200. Reference may be made to elements of FIGS. 2, and 3 in the description of FIG. 2. The computing device 200 may comprise at least one of a computer, a laptop, a smartphone, a personal digital assistant (PDA), and any device configured to perform computing functions (e.g., execute instructions). The computing device 200 may use the exemplary communication device 300 shown in FIG. 3 to communicate with a communication network. The computing device 200 may use the interface module 220 to connect to and/or communicate with the communication device 300 shown in FIG. 3. The interface module 220 may also connect to and/or communicate with other types of device (e.g., peripherals such as mice, keyboards, flash storage drives etc.). The interface module 220 may be connected to a power supply 216. The power supply 216 may be used to provide power (e.g., electrical current and/or voltage) to the interface module 220. The interface module 220 may provide the power received from the power supply 216 to the communication device 300 shown in FIG. 3. The interface module 220 may be connected to the storing module 208. The interface module 220 may use the storing module 208 to read, write, and/or access data. The interface module 220 is also connected to a processing module 204. The processing module 204 may also be connected to the storing module 208, the input/output module 212, and the power supply 216. The processing module 204 may process data, compute data, and calculate data, data received from the interface module 220. The processing module may also execute instructions received from the interface module 220 and the input/output module 212. The processing module 204 may also use the storing module 208 to read, write, and/or access data. The processing module 204 may also use power received from the power supply 216.

The interface module 220 may comprise at least one of a port configured to physically receive the communication device 300, a connector configured to physically connect to the communication device 300, and a jack configured to physically receive the communication device 300. The interface module 220 may use any type of interface standard to communicate data with and/or connect to devices such as the communication device 300. For example, the interface module 220 may comprise at least one of a USB 1.0 interface, a USB 1.1 interface, a USB 2.0 interface, a USB 3.0 interface, an IEEE 1394 (FireWIre) interface, and a Personal Computer Memory Card International Association (PCMCIA) interface. The interface module 220 may also comprise software instructions, hardware (e.g., a circuit), and/or a combination of both software instructions and hardware. Although the forgoing description and certain exemplary embodiments may refer to the USB interface, any interface standard may be used by the computing device 200 and the communication device 300.

The processing module 204 may comprise at least one of general purpose single or multi-chip microprocessor such as an ARM, Pentium®, Pentium II®, Pentium III®, Pentium IV®, Pentium® Pro, an 8051, a MIPS®, a Power PC®, an ALPHA®, an application specific integrated circuit (ASIC), any special purpose microprocessor such as a digital signal processor, microcontroller, or a programmable gate array, and any time of circuit configured to execute instructions.

The storing module 208 may comprise circuit types, such as an EEPROM (Electrically Erasable Programmable Read Only Memory), an EPROM (Electrical Programmable Read Only Memory), a ROM (Read Only Memory), RAM (Random Access Memory), an ASIC (Application Specific Integrated Circuit), other volatile storage devices, or non-volatile storage devices, a magnetic disk (e.g., a floppy disc), hard drives, an optical disk (e.g., a CD-ROM or a DVD-ROM), a memory card, flash memory, magnetic tape, Zip drives, and other types of circuits configured to store and/or modify data. The storing module 208 may also comprise processing module cache, including a multi-level hierarchical cache in which different levels have different capacities and access speeds.

The input/output module 212 may comprise a keyboard, mouse, touch pad, touch screen, lever, knob, dial, slider, or some other means for providing input. The input/output module 212 may also comprise an LCD monitor, a CRT monitor, a plasma monitor, a touch screen or some other means for displaying media.

The power supply 216 may comprise a voltage source, or a hardware and/or software component connected to the voltage source and configured to provide the electrical current and/or voltage received from the voltage source to devices, modules and components connected to the power supply 216. The power supply 216 may comprise a computer power supply, an uninterruptable power supply (UPS), and a power adapter.

Although described separately, it is to be appreciated that functional blocks described with respect to the computing device need not be separate structural elements. For example, the processing module 204 and the storing module 208 may be embodied in a single chip. The processing module 204 may additionally, or in the alternative, contain memory, such as registers. Similarly, one or more of the functional blocks or portions of the functionality of various blocks may be embodied in a single chip. Alternatively, the functionality of a particular block may be implemented on two or more chips. In one embodiment, the processing module 204, the storing module 208, the input/output module 212, the power supply 216, and the interface module 220 may all be interconnected (e.g., each of the components is connected to every other component). In another embodiment, each of the above-referenced components may be connected to each other in a variety of different combinations.

One or more of the functional blocks and/or one or more combinations of the functional blocks described with respect to the computing device 200, such as the processing module 204 and the interface module 220, may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the computing device 200 may also be implemented as a combination of computing devices, e.g., a combination of a DSP and a microprocessor, a plurality of microprocessors, one or more microprocessors in conjunction with a DSP communication, or any other such configuration.

Figure 3:
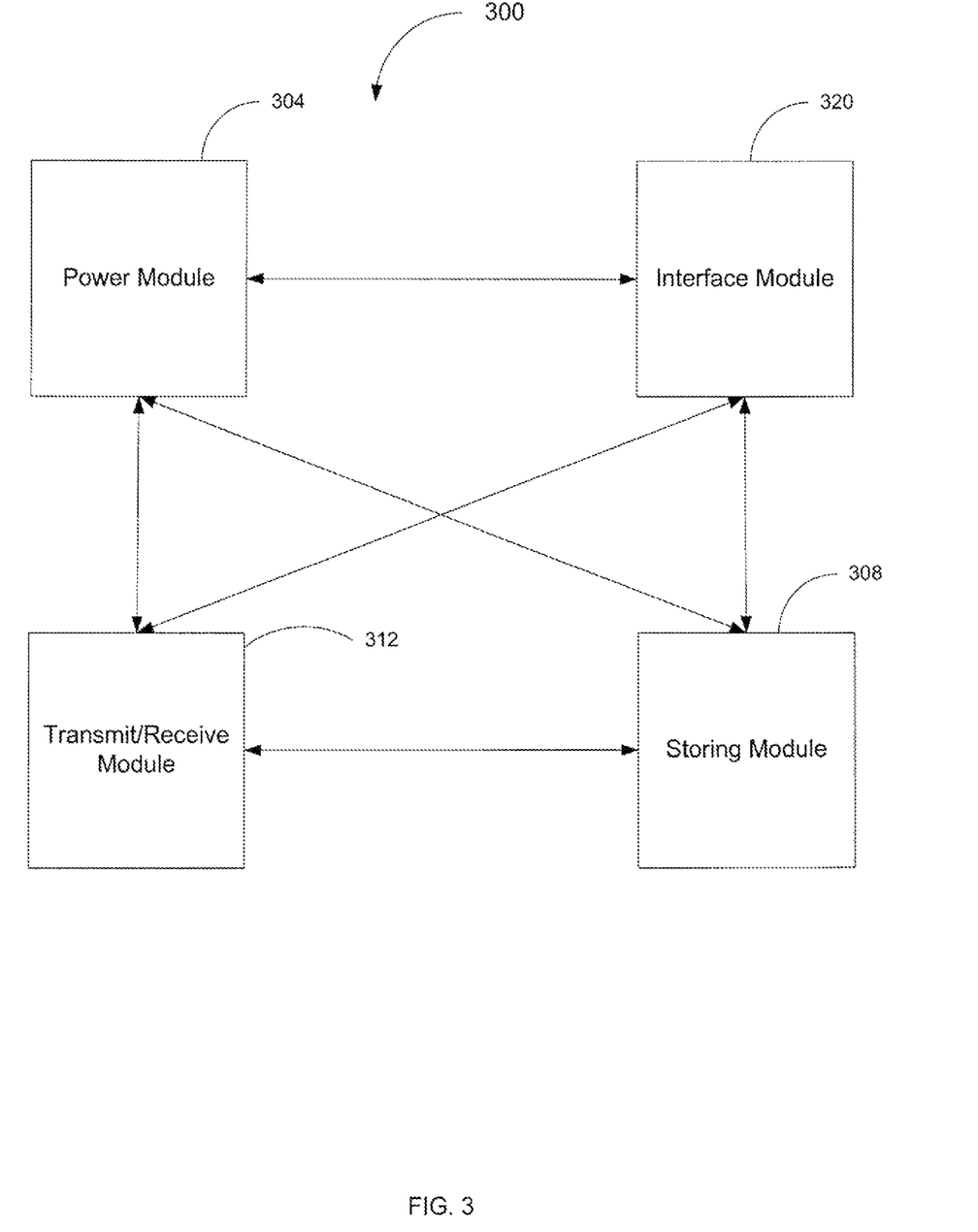
FIG. 3 is a block diagram of an exemplary communication device.

FIG. 3 is a block diagram of an exemplary communication device 300. Reference may be made to elements of FIGS. 1, and 2 in the description of FIG. 3. The communication device 300 may comprise at least one of a wireless modem, a network interface card, a radio card, a mobile broadband card, a USB modem, a wireless data card, a PCMCIA card, and any device configured to communicate with a communication network. The communication device 300 may be used by the computing device 200 shown in FIG. 2 to communicate with a communication network. The communication device 300 may be used by the computing device 200 shown in FIG. 2 to communicate with a communication network. The communication device 300 may use the interface module 320 to connect to and/or communicate with the computing device 200 shown in FIG. 2. For example, the interface module 320 may comprise a USB interface and may be used to connect the communication device 300 (e.g., a USB modem) to the computing device 200 (e.g., a laptop computer).

The interface module 320 may be connected to a power module 304. The power module 304 may be used to provide power (e.g., electrical current and/or voltage) to the communication device 300. The power module 304 may use the interface module 210 to connect to a power source. For example, the interface module 320 of the communication device 300 may be connected the interface module 220 of the computing device 200. The interface module 220 of the computing device 200 may be connected to the power supply 216 of the computing device 200 as shown in FIG. 2. The power module 304 may receive power from the power supply power supply 216 of the computing device 200, via the interface module 220 of the computing device 200 and the interface module 320 of the communication device. The power module 304 may also be connected to the storing module 308. The power module 304 may use the storing module 308 to read, write, and/or access data.

The interface module 320 may be connected to the storing module 308. The interface module 320 may use the storing module 308 to read, write, and/or access data. The interface module 320 may be connected to the transmit/receive module 312. The transmit/receive module 312 may use the interface module 320 to provide data received from the communication network to, the computing device 200. The transmit/receive module 312 may also receive data from the computing device 200 via interface module 320, to transmit to the communication network. The transmit/receive module 312 may be used to communicate with a communication network. The transmit/receive module 312 may be connected to use the power module 304 to provide power, voltage, and/or current in order to perform communications with the communication network.

The interface module 320 may comprise at least one of a port configured to physically receive a connection from the computing device 200, a connector configured to physically connect to the computing device 200, and a jack configured to physically connect to the computing device 200. The interface module 320 may use any type of interface standard to communicate data with and/or connect to devices such as the computing device 200. For example, the interface module 320 may comprise at least one of a USB 1.0 interface, a USB 1.1 interface, a USB 2.0 interface, a USB 3.0 interface, an IEEE 1394 (FireWire) interface, and a Personal Computer Memory Card International Association (PCMCIA) interface. The interface module 320 may also comprise software instructions, hardware (e.g., a circuit), and/or a combination of both software instructions and hardware.

The power module 304 may comprise at least one of general purpose single or multi-chip microprocessor such as an ARM, Pentium®, Pentium II®, Pentium III®, Pentium IV®, Pentium® Pro, an 8051, a MIPS®, a Power PC®, an ALPHA®, an application specific integrated circuit (ASIC), any special purpose microprocessor such as a digital signal processor, microcontroller, or a programmable gate array, and any type of circuit configured to execute instructions.

The storing module 308 may comprise circuit types, such as an EEPROM (Electrically Erasable Programmable Read Only Memory), an EPROM (Electrical Programmable Read Only Memory), a ROM (Read Only Memory), RAM (Random Access Memory), an ASIC (Application Specific Integrated Circuit), other volatile storage devices, or non-volatile storage devices, a magnetic disk (e.g., a floppy disc), hard drives, an optical disk (e.g., a CD-ROM or a DVD-ROM), a memory card, flash memory, magnetic tape, Zip drives, and other types of circuits configured to store and/or modify data. The storing module 510 may also comprise processing module cache, including a multi-level hierarchical cache in which different levels have different capacities and access speeds.

Although described separately, it is to be appreciated that functional blocks described with respect to the computing device need not be separate structural elements. For example, the power module 304 and the storing module 308 may be embodied in a single chip. The power module 304 may additionally, or in the alternative, contain memory, such as registers. Similarly, one or more of the functional blocks or portions of the functionality of various blocks may be embodied in a single chip. Alternatively, the functionality of a particular block may be implemented on two or more chips.

One or more of the functional blocks and/or one or more combinations of the functional blocks described with respect to the communication device 300, such as the power module 304 and the interface module 320, may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the communication device 300 may also be implemented as a combination of computing devices, e.g., a combination of a DSP and a microprocessor, a plurality of microprocessors, one or more microprocessors in conjunction with a DSP communication, or any other such configuration.

The modules shown in FIGS. 2 and 3 may comprise software modules, software components, and software applications. As will be appreciated by one of ordinary skill in the art, each of the modules may comprise various sub-routines, procedures, definitional statements and macros. Each of the modules are typically separately compiled and linked into a single executable program. Therefore, the following description of each of the modules is used for convenience to describe the functionality of certain embodiments. Thus, the processes that are undergone by each of the modules may be arbitrarily redistributed to one of the other modules, combined together in a single module, or made available in, for example, a shareable dynamic link library. The modules may be written in any programming language such as, for example, C, C++, BASIC, Visual Basic, Pascal, Ada, Java, HTML, XML, or FORTRAN, and executed on an operating system, such as variants of Windows, Macintosh, UNIX, Linux, VxWorks, or other operating system. C, C++, BASIC, Visual Basic, Pascal, Ada, Java, HTML, XML and FORTRAN are industry standard programming languages for which many commercial compilers can be used to create executable code.

Figure 4:
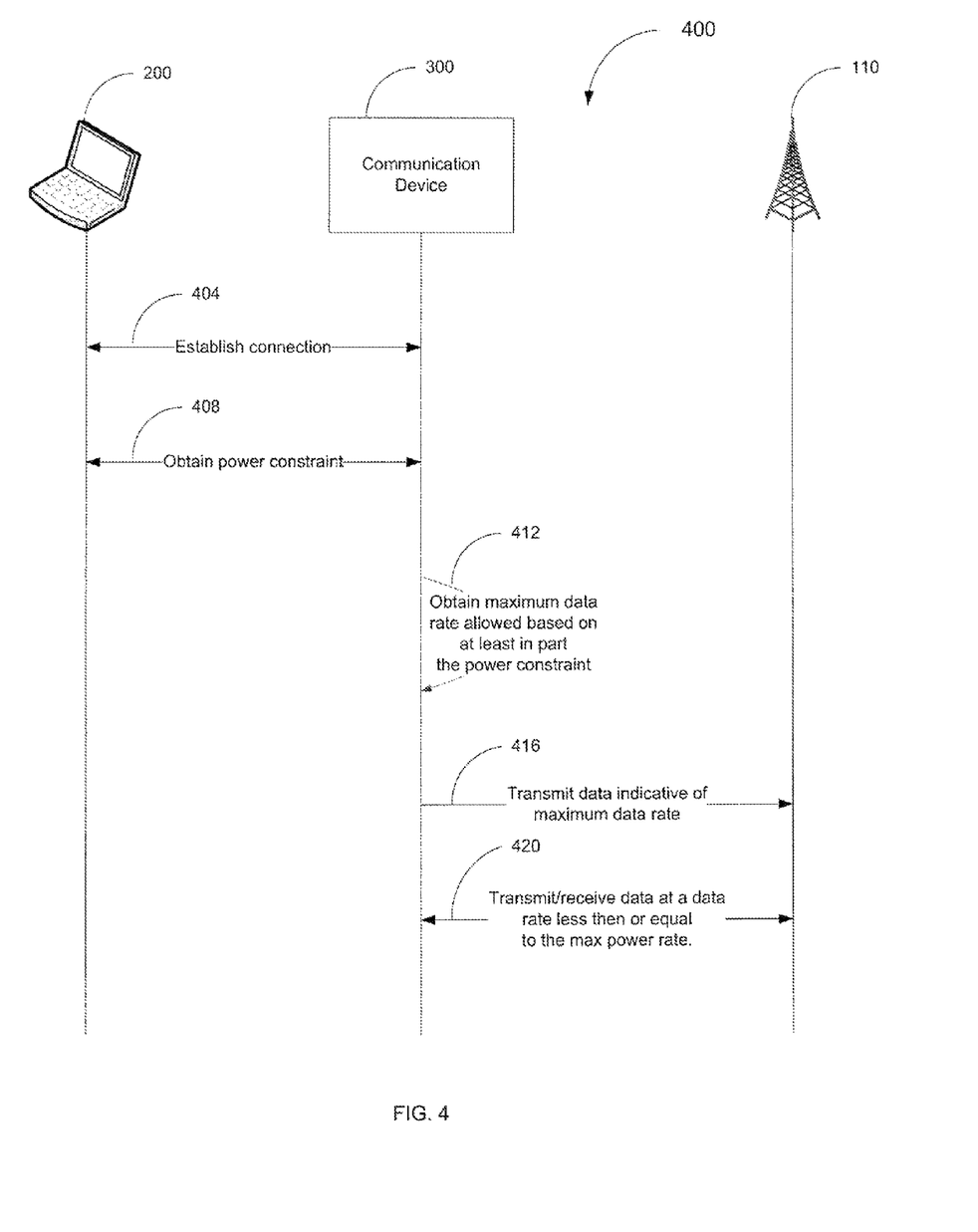
FIG. 4 is a message flow path diagram illustrating various exemplary messages exchanged among between the computing device of FIG. 2, the communication device of FIG. 3 and an exemplary base station.

FIG. 4 is a message flow path diagram 400 illustrating various exemplary messages and/or communications exchanged among between the computing device 200 of FIG. 2, the communication device 300 of FIG. 3 and a base station 110. Reference may be made to elements of FIGS. 1, 2, and 3 in the description of FIG. 4. Three entities, the computing device 200 of FIG. 2, the communication device 300 of FIG. 3 and the base station 110 of FIG. 1 are shown in the top of FIG. 4. Various message flow paths (e.g., message sent from one entity to another) such as message flow path 404, are shown as lines between the entities. The vertical dimension of FIG. 4 represents the passage of time going from the top of FIG. 4 (earlier point in time) to the bottom of FIG. 4 (later point in time). The various message flow paths progress from the top of FIG. 4 to the bottom of FIG. 4. Reference may be made to elements of FIGS. 1, 2, and 3 in the description of FIG. 4.

As discussed above in conjunction with FIGS. 2 and 3, the computing device 200 may use the communication device 300 to communicate with the communication network 120. The computing device 200 and the communication device 300 may communicate with the base station 110 of the communication network. The computing device 200 establishes a connection with the communication device 300 as shown by the message flow path 404. In one embodiment, this may occur when the communication device 300 is plugged into and/or connected to the computing device 200. For example, the communication device 300 (e.g., a USB modem) may be connected to the computing device 200 (e.g., a laptop computer) via a USB port. In another embodiment, this may occur when the communication device 300 is activated. For example, the communication device 300 (e.g., a USB modem) may already be physically connected to the computing device 200 (e.g., a laptop computer), but may be turned off. The communication device 300 may establish a connection with the computing device 200 after it is turned on.

After the communication device 300 is connected to the computing device 200, the communication device 300 may obtain a power constraint as shown by message flow path 408. As discussed above in conjunction with FIGS. 2 and 3, the power supply 216 of the computing device 200 may be used to provide power to the communication device 300 via the interface module 220 of the computing device 200 and the interface module 320 of the communication device. In one embodiment, the computing device 200 may limit the amount of power which the communication device 300 may use. For example, a USB modem (e.g., communication device 300) may be connected to a laptop computer (computing device 200) via a USB interface (e.g., interface modules 120 and 220). The USB interface may be used to provide power from the laptop computer to the USB modem. In one embodiment, the laptop computer may limit the amount of power that the USB modem can use to 500 milliamps (mA). In other embodiments, the laptop may limit the amount of power that the USB modem can use to a variety of different power constraints (e.g., 100 mA, 200 mA, 900 mA etc.).

In one embodiment, the communication device 300 may obtain the power constraint by querying the computing device. For example, the communication device 300 may send an AT command to the computing device 200 requesting information related to the power constraint. In another example, the communication device 300 may send a USB message to the computing device 200 requesting information related to the power constraint. In another embodiment, the computing device 200 may inform the communication device 300 of the power constraint. For example, the computing device 200 may send an AT command to the communication device 300 with information related to the power constraint. In another example, the communication device 300 may send a USB message to the computing device 200 with information related to the power constraint. In another embodiment, the communication device 300 may store power constraint information for a variety of computing devices in the storing module 308. For example, the communication device 300 may store the power constraint for specific computing devices that the communication device 300 has connected to before. In another embodiment, the communication device 300 may store power constraint for a particular type of computing device. For example, the communication device 300 may store power constraint information for laptops, tablet PCs, and desktop computer systems.

After obtaining the power constraint, the communication device 300 may obtain the maximum data rate allowed for communication with the base station 110, based on, at least in part, the power constraint received in message flow path 412. The communication device 300 may use the power module 304 to obtain the maximum data rate allowed. The communication device 300 may also use the storing module 308 to obtain the maximum data rate allowed. In one embodiment, the power module 304 may use the power constraint to calculate the maximum data rate allowed. For example, the power module 304 may use a formula (e.g., take the power constraint and divide it by two) which uses the power constraint obtained in the message flow path 408 to determine the maximum data rate. In another embodiment, the power module 304 may use the power constraint obtained in the message flow path 408 and the storing module 308 to obtain the maximum data rate allowed. For example, the storing module 308 may store a list of power constraints and a maximum data rate associated with each of the power constraints in the list. The power module 304 may use the power constraint obtained in the message flow path 408 and match it with a power constraint in the list of power constraints stored in the storing module. The power module 304 may then obtain the maximum data rate associated with the matching power constraint. The maximum data rate allowed based on, at least in part, the power constraint of the computing device 200 may be lower then the maximum possible data rate for the wireless link between the communication device 300 and the base station 110. For example, the maximum possible data rate for the wireless link between the communication device 300 and the base station 110 may be 10 mbps, but the maximum data rate allowed based on, at least in part, the power constraint of the computing device 200 may be only be 2 mbps.

After obtaining the maximum data rate allowed based on, at least in part, the power constraint of the computing device 200, the wireless communication device 300 may transmit data indicative of the maximum data rate to the base station 110. In another embodiment, the wireless communication device 300 may also transmit data indicative of the power, constraint obtained in message flow path 408, to the base station 110, as shown by the message flow path 416. After the transmitting data indicative of the maximum data rate and/or the power constraint to the base station 110, the wireless communication device and/or the computing device 200 may transmit data to and receive data from the base station 110, as shown by the message flow path 420. In one embodiment, the base station 110 may limit the data rate of the data it transmits to the communication device 300 to the maximum data rate obtained in message flow path 412. In another embodiment, the communication device 300 may limit the data rate of the data it transmits to the base station 110 to the maximum data rate obtained in message flow path 412. In yet another embodiment, the communication device 300 may transmit data to the base station 110 at a data rate lower than the maximum data rate obtained in message flow path 412. In a further embodiment, the base station 110 may transmit data to the communication device 300 at a data rate lower than the maximum data rate obtained in message flow path 412.

Figure 5:
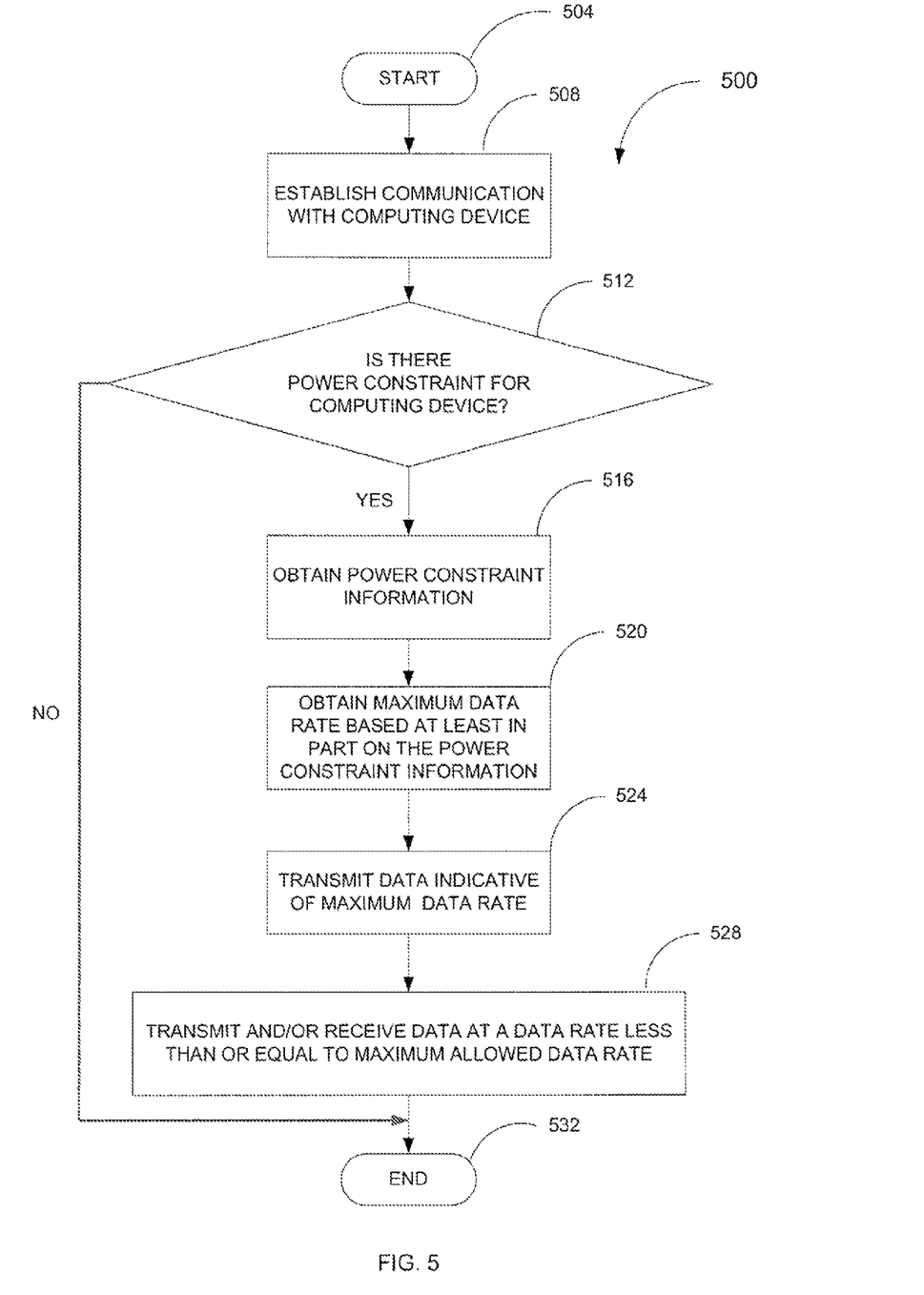
FIG. 5 is a flowchart illustrating a first exemplary rate selection process.

FIG. 5 is a flowchart illustrating a first exemplary rate selection process 500. Reference may be made to elements of FIGS. 1, 2, and 3 in the description of FIG. 5. The process 500 may be used by the computing device 200 and the communication device 300 when communicating data with the base station 110. The process 500 begins at start block 504 and ends at end block 532. In one embodiment, part or all of the process 500 may be performed using elements of the communication device 300. For example, the part of all of the process 500 may be performed using the power module 304 of the communication device 300 and the storing module 308 of the communication device 300. In one embodiment, part or all of the process 500 may be performed using elements of the computing device. For example, the part of all of the process 500 may be performed using the processing module 204 of the computing device 200 and/or the storing module 208 of the computing device 200.

The process starts at start block 504 and moves to block 508, where the communication device 300 establishes communication with the computing device 200. As discussed above in conjunction with FIG. 4, the communication device 300 may establish communication with the computing device 200 when the communication device 300 is connected to the computing device 200. Or the communication device 300 already be connected to the computing device 200 and may establish communication with the computing device 200 when the communication device 300 is turned on. After the communication device 300 establishes communication with the computing device 200, the process 500 moves to block 512, where the communication device 300 determines if there is a power constraint for the computing device 200. For further information on how the communication 300 determines if there is a power constraint for the computing device 200, see the written description for FIG. 4.

If there is no power constraint the process 500 moves to end block 532 where the process 500 ends. If there is a power constraint, the process 500 moves to block 516, where the communication device 300 obtains power constraint information. For further information on how the communication device 300 obtains power constraint information, see the written description for FIG. 4. After obtaining the power constraint information, the process 500 moves to block 520, where the communication device 300 obtains the maximum data rate based on, at least in part, the power constraint obtained in block 516. For further information on how the communication 300 obtains the maximum data rate, see the written description for FIG. 4. After obtaining the maximum data rate, the process 500 moves to block 524, where the communication device 300 transmits data indicative of the maximum data rate to the base station 110. After the transmitting data indicative of the maximum data rate to the base station, the process 500 moves to block 528, where the communication device 300 transmits to and/or receives data from the base station at a data rate less than or equal to the maximum allowed data rate obtained in block 520. The process 500 the moves to block 532 where the process 500 ends.

By transmitting and/or receiving data at a data rate less than or equal to the maximum allowed data rate, the power used by the communication device 300 remains within the power constraint. For example, the power constraint for the computing device 200 may be 500 mA of power. The computing device may obtain a maximum allowed data rate of 2 mbps based on the power constraint of 500 mA. If the communication device 300 transmits/receives data at no more than 2 mbps, then the communication device 300 will use no more than 500 mA of power. When the communication device 300 consumes power within the power constraint of the computing device 300, errors such as device resets, dropped wireless links, and data errors may be avoided.

In one embodiment, the process 500 may be repeated multiple times. For example, the computing device 200 may obtain a second power constraint. The second power constraint may be different from the power constraint used previously to determine the maximum data rate. The process 500 may be performed again by the communication device 300 and/or the computing device 200 in order to transmit a second maximum data rate, based on the second power constraint, to the base station 110. The base station 110 and the communication device 300 may then transmit and/or receive data between each other at a data rate less than or equal to the second maximum data rate. For example, the computing device 200 may be a laptop that is low on battery power. The computing device 200 may obtain the second power constraint to save battery power. The computing device 200 may communicate the power constraint with the communication device 300, and the communication device 300 may obtain a second maximum data rate based on the power constraint. The communication device 300 may transmit and/or receive data at the second maximum data rate which may be lower then the original maximum data rate, in order to save power.

Figure 6:
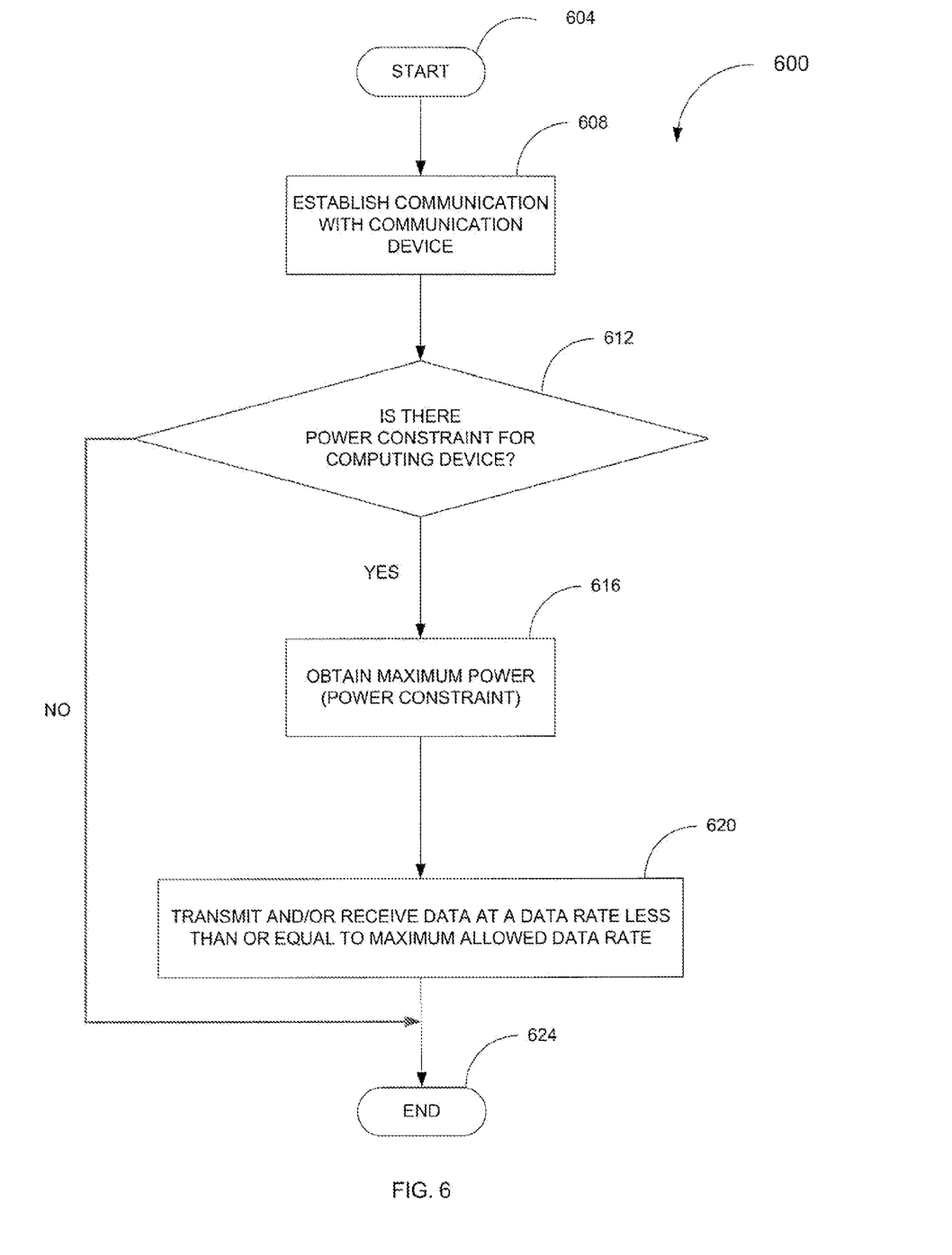
FIG. 6 is a flowchart illustrating a second exemplary rate selection process.

FIG. 6 is a flowchart illustrating a second exemplary rate selection process 600. Reference may be made to elements of FIGS. 1, 2, and 3 in the description of FIG. 6. The process 600 may be used by the base station 110 when communicating data with the computing device 200 and/or the communication device 300. The process 600 begins at start block 604 and ends at end block 624. The base station 110 may comprise a computing device similar to the computing device 200 of FIG. 2. For example, the base station 110 may comprise at least one of a process module, a storing module, and a input/output module. In another example, the base station 110 may comprise a transmit/receive module which may be used to communicate with the computing device 200 and/or the communication device 300. In one embodiment, part or all of the process 600 may be performed by the processing module, the storing module, the input/output module and/or the transmit/receive module of the base station 110.

The process 600 begins at start block 604 and moves to block 608 where the base station 110 establishes communication with the wireless communication device 300. In one embodiment, this may occur when the communication device 300 forms a wireless communication link with the base station 110. In another embodiment, this may occur when the base station 110 forms a wireless communication link with the communication device 300. After establishing communication with the communication device 300, the process 600 moves to block 612, where the base station 110 determines if there is a power constraint for the computing device 200. In one embodiment, data indicative of the power constraint and/or data indicative of the maximum data rate may be transmitted by the computing device 200, via the communication device 300, to the base station 110. If the base station 110 does not receive data indicative of the power constraint and/or data indicative of the maximum data rate from the communication device 300 or determines that there is no power constraint for the computing device 200, the process 600 moves to end block 624, where the process 600 ends. If the base station 110 receives data indicative of the power constraint and/or data indicative of the maximum data rate or determines that there is a power constraint for the computing device 200, the process 600 moves to block 616, where the base station 110 obtains the maximum power that the communication device 300 may use, e.g., the power constraint. In an embodiment, the base station 110 may obtain the power constraint and may obtain the maximum data rate based at least in part on the data indicative of the power constraint received from the communication device 300. In another embodiment, the base station 110 may obtain the data rate from the data indicative of the power constraint and/or data indicative of the maximum data rate received from the communication device 300. After obtaining the maximum data rate, the process 600 moves to block 620, where the base station 110 transmits to and/or receives data from the communication device 300 at a data rate less than or equal to the maximum allowed data rate. The process 600 then moves to end block 624, where the process 600 ends.

In an embodiment, the process 600 may be repeated multiple times. For example, the computing device 200 may obtain a second power constraint. The second power constraint may be different from the power constraint used previously to determine the maximum data rate. The process 600 may be performed again by the base station obtain a second maximum data rate from the communication device 300. The base station 110 and the communication device 300 may then transmit and/or receive data between each other at a data rate less than or equal to the second maximum data rate. For example, the computing device 200 may be a laptop that is low on battery power. The computing device 200 may obtain the second power constraint to save battery power. The computing device 200 may communicate the power constraint with the communication device 300, and the communication device 300 may obtain a second maximum data rate based on the power constraint. The communication device 300 may transmit and/or receive data at the second maximum data rate which may be lower then the original maximum data rate, in order to save power.

The systems and techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Terminologies associated with different technologies may vary. For example, depending on the technology considered, a User Equipment (UE) used in the WCDMA standards may sometimes be called an Access Terminal (AT), a user terminal, a Mobile Station (MS), a subscriber unit, a User Equipment (UE), etc. Likewise, an Access Network (AN) used in the WCDMA standards may sometimes be called an access point, an Access Node (AN), a Node B, a Base Station (BS), a cell tower and so forth. It should here be noted that different terminologies apply to different technologies when applicable.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Those of skill will recognize that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, and any other form of non-transitory storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Furthermore, in one or more exemplary embodiments, the functions described may be may be stored on or transmitted over a network as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In one embodiment, the software instructions may be transmitted from a website, server, or other remote source using a coaxial cable, fiber optic cable, twisted pair, digital subscriber line (DSL), or wireless technologies such as infrared, radio, and wireless technologies such as infrared, radio, and microwave.

While the above detailed description has shown, described, and pointed out novel features of the invention as applied to various embodiments, it will be understood that various omissions, substitutions, and changes in the form and details of the device or process illustrated may be made by those skilled in the art without departing from the scope of the invention. In addition, the steps described in the above-referenced figures may be performed in a different order, may be performed simultaneously and certain of the steps may be omitted. As will be recognized, the invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A wireless communication apparatus comprising:
   an interface configured to physically connect the wireless communication apparatus to a first computing device, wherein the first computing device is configured to power the wireless communication apparatus;
   a processor configured to identify a maximum data rate for the wireless communication apparatus based, at least in part, on a power constraint of the first computing device, wherein the power constraint limits an amount of power the first computing device can provide the wireless communication apparatus; and
   a transceiver configured to transmit data indicative of the maximum data rate to a base station.

2. The wireless communication apparatus of claim 1, wherein the processor is further configured to identify the power constraint by querying the first computing device.

3. The wireless communication apparatus of claim 1, wherein the processor is further configured to identify the power constraint by receiving the power constraint from the first computing device.

4. The wireless communication apparatus of claim 1, wherein identifying the maximum data rate includes calculating the maximum data rate using the power constraint.

5. The wireless communication apparatus of claim 1, wherein identifying the maximum data rate includes obtaining the maximum data rate from a memory.

6. The wireless communication apparatus of claim 1, wherein the transceiver is further configured to transmit data indicative of the power constraint to the base station.

7. The wireless communication apparatus of claim 1, wherein the transceiver is further configured to transmit and receive data at a rate less than or equal to the maximum data rate.

8. The wireless communication apparatus of claim 1, wherein:
   the processor is further configured to obtain a second power constraint; and
   the transceiver is further configured to:
      transmit data indicative of the second power constraint to the base station; and
      transmit and receive data at a second maximum data rate wherein the second maximum data rate is based at least in part on the second power constraint.

9. The wireless communication apparatus of claim 1, wherein the maximum data rate is less than a supported data rate of at least one of the base station and the apparatus.

10. A wireless communication apparatus comprising:
    an interface configured to physically connect the wireless communication apparatus to a first computing device, wherein the first computing device is configured to power the wireless communication apparatus;
    a processor configured to identify a maximum data rate for the wireless communication apparatus based on, at least in part, a power constraint of the first computing device, wherein the power constraint limits an amount of power the first computing device can provide the wireless communication apparatus; and
    a transceiver configured to transmit data indicative of the maximum data rate to a base station.

11. The wireless communication apparatus of claim 10, wherein said processor configured to identify the maximum data rate is further configured to identify the power constraint by querying the first computing device.

12. The wireless communication apparatus of claim 10, wherein said processor configured to identify the maximum data rate is further configured to identify the power constraint by receiving the power constraint from the first computing device.

13. The wireless communication apparatus of claim 10, wherein identifying the maximum data rate includes calculating the maximum data rate using the power constraint.

14. The wireless communication apparatus of claim 10, wherein identifying the maximum data rate includes obtaining the maximum data rate from a memory.

15. The wireless communication apparatus of claim 10, wherein said transceiver is further configured to transmit data indicative of the power constraint to the base station.

16. The wireless communication apparatus of claim 10, wherein said transceiver is further configured to transmit and receive data at a rate less than or equal to the maximum data rate.

17. The wireless communication apparatus of claim 10, wherein:
   said processor is further configured to obtain a second power constraint; and said transceiver is further configured to transmit data indicative of the second power constraint to the base station, and transmit data at a second maximum data rate; wherein the second maximum data rate is based at least in part on the second power constraint.

18. The wireless communication apparatus of claim 10, wherein the maximum data rate is less than a supported data rate of at least one of the base station and the apparatus.

19. A method of communicating data, the method comprising:
   identifying a maximum data rate based, at least in part, on a power constraint of a first computing device, the first computing device being physically connected to a wireless communication apparatus via an interface, wherein the power constraint limits an amount of power the first computing device can provide the wireless communication apparatus; and
   transmitting data indicative of the maximum data rate to a base station.

20. The method of claim 19, further comprising querying the first computing device for the power constraint.

21. The method of claim 19, further comprising receiving the power constraint from the first computing device.

22. The method of claim 19, further comprising calculating the maximum data rate using the power constraint.

23. The method of claim 19, further comprising obtaining the maximum data rate from a memory.

24. The method of claim 19, further comprising transmitting data indicative of the power constraint to the base station.

25. The method of claim 19, further comprising transmitting and receiving data at a rate less than or equal to the maximum data rate.

26. The method of claim 19, further comprising:
   obtaining a second power constraint;
   transmitting data indicative of the second power constraint to the base station; and
   transmitting and receiving data at a second maximum data rate,
   wherein the second maximum data rate is based at least in part on the second power constraint.

27. The method of claim 19, wherein the maximum data rate is less than a supported data rate of at least one of the base station and the apparatus.

28. A non-transitory storage medium, comprising:
   code for causing a computer to identify a maximum data rate based on, at least in part, a power constraint of a first computing device, the first computing device being physically connected to a wireless communication apparatus via an interface, wherein the power constraint limits an amount of power that the first computing device can provide the wireless communication apparatus; and
   code for causing a computer to transmit data indicative of the maximum data rate to a base station.

29. The storage medium of claim 28, further comprising code for causing a computer to query the first computing device for the power constraint.

30. The storage medium of claim 28, further comprising code for causing a computer to receive the power constraint from the first computing device.

31. The storage medium of claim 28, further comprising code for causing a computer to calculate the maximum data rate using the power constraint.

32. The storage medium of claim 28, further comprising code for causing a computer to obtain the maximum data rate from a memory.

33. The storage medium of claim 28, further comprising code for causing a computer to transmit data indicative of the power constraint to the base station.

34. The storage medium of claim 28, further comprising code for causing a computer to transmit and receive data at a rate less than or equal to the maximum data rate.

35. The storage medium of claim 28, further comprising:
   code for causing a computer to obtain a second power constraint;
   code for causing a computer to transmit data indicative of the second power constraint to the base station; and
   code for causing a computer to transmit and receive data at a second maximum data rate,
   wherein the second maximum data rate is based at least in part on the second power constraint.

36. The storage medium of claim 28, wherein the maximum data rate is less than a supported data rate of at least one of the base station and the apparatus.

* * * * *